UNITED STATES PATENT OFFICE.

CHARLES DE LA HARPE, OF BASLE, SWITZERLAND, ASSIGNOR TO FIRM OF DYE WORKS, FORMERLY L. DURAND HUGUENIN & CO., OF BASLE, SWITZERLAND.

LEUCOGALLOCYANIN AND PROCESS OF MAKING SAME.

SPECIFICATION forming part of Letters Patent No. 704,301, dated July 8, 1902.

Application filed February 27, 1902. Serial No. 95,995. (Specimens.)

*To all whom it may concern:*

Be it known that I, CHARLES DE LA HARPE, chemist, a citizen of the Swiss Republic, and a resident of Basle, Switzerland, have invented certain Improvements in the Manufacture of Leucogallocyanins, of which the following is a clear, full, and exact specification.

In treating the sulfonic gallocyanins—for example, those obtained by the reaction of the nitrosoalkylbenzylanilinsulfonic acids upon gallic acid or its derivatives (such as gallamic acid, ethers of gallic acid, gallanilid, &c.) or those obtained by sulfonating (with the usual sulfonating agents) the product of reaction of the nitrosodiphenylamin upon gallic acid or its derivatives—by the reducing agents mentioned in Letters Patent No. 629,666, of July 25, 1899, there will be obtained sulfonic leucogallocyanins analogous to those of the aforesaid Letters Patent, but giving on the fiber shades differing from those obtained with the leucogallocyanins of the said Letters Patent.

Example: Fifty kilos of the gallocyanin obtained by the reaction of nitrosoethylbenzylanilinsulfonic acid upon gallamic acid are dissolved in one thousand liters of water containing five kilos and a half of soda. There are added thirty-three kilos of acetic acid of forty per cent., and then gradually, while strongly stirring, twelve kilos of zinc-dust. After some time twenty kilos of hydrochloric acid of 20° Baumé are added slowly. The reduction is let to terminate, whereupon common salt is added and the mass then filtered. The precipitate thus obtained is dissolved in warm condition in two thousand liters of water, filtered, and the solution thus obtained of the sulfonic leucogallocyanin is precipitated by common salt. The coloring-matter thus obtained forms a greenish paste soluble in hot water with a yellowish-green color and in sodium acetate with a pale-blue color and dyeing chromium mordanted fibers in blue shades. Its solution in concentrated sulfuric acid offers a reddish coloration, turning to blue by addition of small quantities of an oxidizing agent.

In this example the gallocyanin derived from the nitrosoethylbenzylanilinsulfonic acid and gallamic acid may be replaced by any other sulfonic gallocyanin. Likewise the reducing agent used in the foregoing example may be replaced by the other reducing agents mentioned in the Letters Patent No. 629,666.

What I claim is—

1. An improvement in the manufacture of leucogallocyanins, consisting in treating the sulfonic gallocyanins by a reducing agent, substantially as set forth.

2. An improvement in the manufacture of leucogallocyanins, consisting in treating a sulfonic gallocyanin derived from a nitrosoalkylbenzylanilinsulfonic acid by a reducing agent, substantially as set forth.

3. An improvement in the manufacture of the leucogallocyanins, consisting in treating a sulfonic gallocyanin derived from the nitrosoethylbenzylanilinsulfonic acid, by a reducing agent, substantially as set forth.

4. As a new article of manufacture, the sulfonated leucogallocyanin obtained by means of a gallocyanin derived from a nitrosoalkylbenzylanilinsulfonic acid, this sulfonated leucogallocyanin being soluble in hot water with a yellowish-green coloration, in sodium acetate with a pale-blue color and in sulfuric acid with a reddish coloration turning to blue by addition of small quantities of an oxidizing agent.

In witness whereof I have hereunto signed my name, this 13th day of February, 1902, in the presence of two subscribing witnesses.

CHARLES DE LA HARPE.

Witnesses:
GEO. GIFFORD,
ARMAND RITTER.